Nov. 28, 1944.   J. RAZEK   2,363,690
MEASURING SYSTEM
Filed Jan. 30, 1943
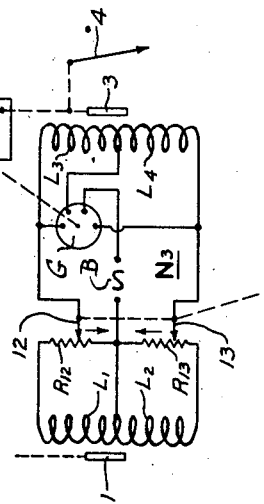
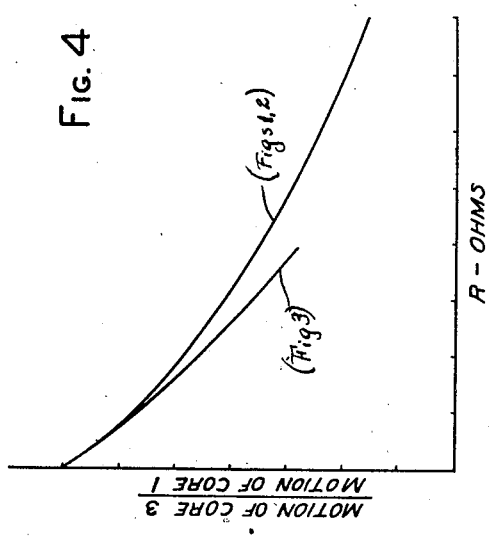
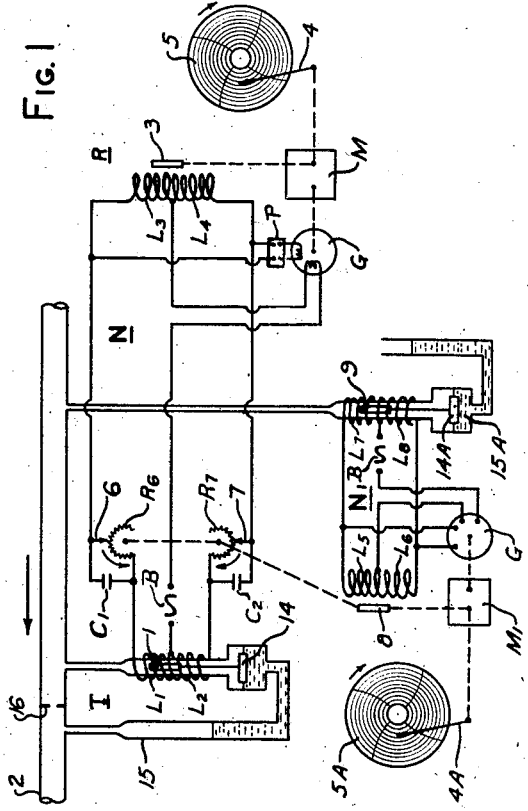
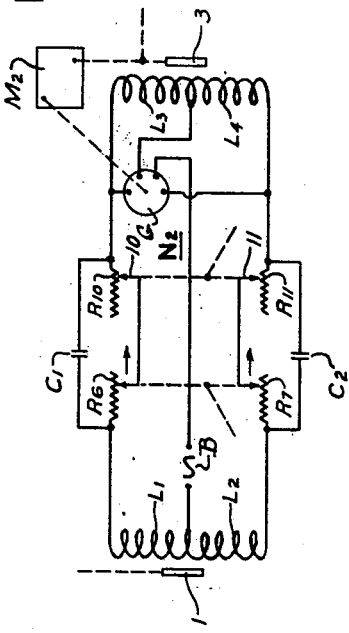
INVENTOR.
Joseph Razek
BY
ATTORNEY.

Patented Nov. 28, 1944

2,363,690

UNITED STATES PATENT OFFICE 2,363,690

MEASURING SYSTEM

Joseph Razek, Llanerch, Pa., assignor to Cochrane Corporation, Philadelphia, Pa., a corporation of Pennsylvania Application January 30, 1943, Serial No. 474,103

9 Claims. (Cl. 177—351)

My invention relates to measuring systems of the type utilizing a network unbalanced, in response to variations in magnitude of the condition under measurement, by changes in position of a core with respect to an inductance coil and rebalanced by corresponding changes in position of another core with respect to an associated inductance coil.

In accordance with my invention, the relation between the extents of movements of the cores, effective respectively to unbalance and restore balance of the network, is varied, as in compensation for the disturbing changes in magnitude of another condition or conditions such as pressure, temperature, or the like, by concurrent adjustments of resistances, preferably shunted by condensers, included respectively in different branches of the network.

My invention further resides in measuring systems having the features of combination and arrangement hereinafter described and claimed.

For an understanding of my invention and for illustration of various forms thereof, reference is made to the accompanying drawing, in which:

Fig. 1 diagrammatically illustrates a flow-measuring system compensated for changes in fluid-density;

Fig. 2 diagrammatically illustrates a modification of the network shown in Fig. 1 suited to compensate for disturbing changes in magnitude of several conditions;

Fig. 3 diagrammatically illustrates another modification of the measuring network of Fig. 1; and Fig. 4 comprises characteristic curves discussed in explanation of the invention.

Referring to Fig. 1, the balanceable network N is essentially an alternating current Wheatstone bridge having the inductance coils L1, L2, L3, and L4 in the four arms thereof. The core or armature 1 common to the coils L1 and L2 and comprising therewith transmitter T is adjusted in response to changes in magnitude of the condition under measurement differentially to vary the inductances of the coils L1 and L2, each position of the core, and therefore each ratio of the inductances of coils L1 and L2, corresponding with a magnitude of the condition under measurement, for example rate of flow of fluid through the conduit 2.

The arrangement for positioning core 1 in accordance with rate of flow may be similar to that disclosed in Letters Patent 2,081,364 to Melas: in brief, the core 1 is supported by float 14 disposed in one leg of the manometer 15 connected to conduit 2 on opposite sides of the orifice plate 16, or equivalent.

The galvanometer G, or equivalent, responds to unbalance of the bridge and, preferably through a mechanical relay mechanism M generally of the type disclosed in United States Letters Patent 2,081,364 to Melas, moves the core or armature 3 with respect to the associated coils L3 and L4 of receiver R until the differential adjustment of their effective inductances restores balance of the network N. Concurrently with adjustment of core 3, the pointer or pen 4 is moved with respect to the chart or scale 5 thus to indicate or record the changes in magnitude of the condition affecting the position of core 1.

One of the galvanometer coils, for example the movable coil, is included in one of the cross-arms of the bridge and the other galvanometer coil, specifically the field coil, is included in the other cross-arm in circuit with a suitable source B of alternating current. If necessary, an external phase-shifting device or network P may be used.

In the system as thus far described, for each position of core 1 there is an unique corresponding position of core 3 for which there is null deflection of the galvanometer. Network N is balanced when the two equations (1) $$\frac{L1}{L2} = \frac{L3}{L4}$$

and (2) $$\frac{R1}{R2} = \frac{R3}{R4}$$

are concurrently satisfied. Inasmuch as the resistances (R1, R2, R3 and R4) of the inductance coils are fixed, the movements of the cores 1 and 3 affect only their inductance ratios. For convenience, the coils have similar characteristics electrical and physical, and the cores have similar characteristics, magnetic and physical.

As thus far described, if the scale or chart 5 of the system were calibrated to read rates of flow in terms of pounds per minute of steam for example, the readings would not be correct for pressures other than the selected standard pressure of calibration and would be in error to extents varying with deviations of pressure of the steam from standard.

The subsequent description concerns compensating arrangements which automatically vary the sensitivity of the network N (in response to calibration-disturbing changes in pressure, for example) to changes in position of core 1 and so for a given change in rate of flow of steam for example enforce a larger or smaller change in position of core 3 in dependence upon the existing density of the steam.

The pressure-compensating means of Fig. 1 comprises the resistances R6 and R7 included respectively in the adjacent arms of the bridge N which include the inductances L1 and L2 of the transmitter T; the portions of the slidewires R6, R7 effectively in circuit are shunted by the fixed condensers C1 and C2 respectively. The slidewires R6 and R7 may be concurrently adjusted with respect to their contacts 6 and 7 by a diaphragm or a "Sylphon" bellows; or preferably, and as shown, they may be adjusted by a second mechanical relay mechanism M1 concurrently with rebalancing adjustment of core 8 with respect to inductance coils L5, L6 of a second bridge network N1 which is unbalanced by change in position of core 9 with respect to a second pair of inductance coils L7, L8 of bridge N1. Core 9 may be actuated by float 14A disposed in manometer 15A connected to conduit 2 for response to change in pressure, or density, of the steam or other fluid. If desired, the changes in pressure or density may be indicated or recorded by pointer or pen 4A movable with respect to chart or scale 5A concurrently with adjustment of slidewires R6, R7 of network N.

It is characteristic of the measuring system N as thus modified that the extent to which core 3 must be moved to restore balance of network N upon change in position of core 1 depends not only upon the extent to which core 1 has been displaced from its previous position, at which the bridge was balanced, but also upon the existing setting of the slidewires R6 and R7. In consequence, the rate of flow of steam in pounds per unit of time may be read directly from chart or scale 5 notwithstanding variations in the density or pressure of the steam.

Over the range of measurement, the ratio of R6 to R7 for all positions of core 3 is constant or substantially so, which makes it feasible to couple the movable elements of R6, R7 for adjustment in unison; the effective parts of R6 and R7, being the parts thereof in circuit, are both increased together or both decreased together.

When desirable or necessary, the constants of the compensating networks C1, R6 and C2, R7 may be so chosen that the ratio between the maximum and minimum extents of movement of core 3 for a given change in position of core 1 may be, as shown by the upper curve of Fig. 4, as great as four to one. By way of example, when the source of current is a 60 cycle 110 volt line, the condensers C1 and C2 may each have a capacity of one microfarad, the maximum magnitude of slidewire resistances R6 and R7 may be about 500 ohms respectively, and each of the coils L1, L4 may have an inductance of 330 to 880 millihenries and a resistance (maximum) of about 200 ohms; for any other substantially different frequency, for example a much higher frequency, to preserve the same ranges of both measurement and compensation, the magnitudes of aforesaid impedances are suitably changed.

As may be confirmed experimentally, the condensers C1, C2 and the resistances which they shunt jointly determine the magnitude of the compensation effected.

Condensers C1 and C2 may be replaced by inductive reactances which jointly with the variable resistances R6, R7 determine the compensation; from practical considerations, however the combination of variable resistance and capacitative reactance is preferred.

When there are two or more variable factors which need to be compensated, recourse may be had to the arrangement shown in Fig. 2 in which there are several pairs of slidewires, one pair for each condition requiring compensation for changes in magnitude thereof. Assuming for simplicity, there are only two such conditions, for example, pressure and temperature, the slidewires R6 and R7 may, as in the system of Fig. 1, be adjusted in unison to compensate for changes in magnitude of one of the conditions, for example density or pressure and a second pair of slidewires, R10 and R11, are coupled for adjustment in unison with respect to their contacts 10 and 11 by a suitable temperature responsive arrangement, such as for example shown in Fig. 4 of aforesaid Melas patent.

The resistances R6 and R10 are connected in series in that arm of the network N2 which includes the inductance coil L1, and similarly the resistances R7 and R11 are included in series in the adjacent branch of the network which includes the inductance L2. It shall be understood that if additional conditions require compensation, there will be a corresponding number of additional pairs of resistances, each pair comprising a resistance included in series with resistances R6, R10 and a second resistance included in series with resistances R7 and R11. All of the resistances included in series in the upper arm of the bridge are shunted by condenser C1 and similarly all of the resistances in series included in the lower arm of the bridge are shunted by a fixed condenser C2.

There may be used the simpler system shown in Fig. 3 in which the slidewires R12 and R13, having generally the purpose of slidewires R6 and R7 of Fig. 1, are connected in shunt to the inductances L1 and L2 respectively, and are movable in unison with respect to their contacts 12 and 13 by any structure positioned directly or indirectly in response to the disturbing changes of some condition such as pressure, temperature or the like. In other respects, the network N3 of Fig. 3 is similar to network N of Fig. 1; elements having the same purpose are identified by the same reference characters in both figures.

It will be understood the absolute and relative magnitudes of the impedances comprised in the compensated networks disclosed, or their equivalents, shall be so chosen as to avoid unstable operation of the galvanometer.

What I claim is:

1. A measuring system comprising a balanceable network including inductance coils having cores movable respectively to unbalance said network in response to change from previous magnitude of a condition and to restore balance thereof at existing magnitude of the condition, and compensating means for varying the relation between the extents of aforesaid movements of said cores comprising groups of resistance and capacitance elements included in different branches of said net-work, and means for effecting in unison adjustment of similar elements of said groups.

2. A measuring system comprising a balanceable network including inductance coils having cores movable respectively to unbalance said network in response to change from previous magnitude of a condition and to restore balance thereof at existing magnitude of the condition, and compensating means for varying the relation between the extents of aforesaid movements of said cores comprising variable resistances included in different branches of said network, means for effecting adjustment of said resistances in unison, and condensers respectively in shunt to said resistances therewith jointly to determine the magnitude of the compensation.

3. A measuring system comprising a balanceable network including inductance coils having cores movable respectively to unbalance said network in response to changes from previous magnitude of a condition and to restore balance thereof at existing magnitude of the conditon, and compensating means for varying the relation between the extents of aforesaid movements of said cores comprising variable resistances, each shunted by fixed capacitance and in series with one coil of each of said pairs thereof, and means for effecting adjustment of said resistances in unison.

4. A measuring system comprising a balanceable network including inductance coils having cores movable respectively to unbalance said network in response to change from previous magnitude of a condition and to restore balance thereof at existing magnitude of the condition, and compensating means for varying the relation between the extents of aforesaid movements of said cores comprising impedance groups each comprising a series of variable resistances and a condenser in shunt to the series, and a plurality of means responsive to disturbing changes of another condition and effective simultaneously in unison to adjust corresponding resistances of said groups.

5. A measuring system comprising a bridge network having an inductance coil in each of four arms thereof, a core movable with respect to one pair of said coils to unbalance said bridge in response to changes in magnitude of a condition, a second core movable with respect to another pair of said coils, means responsive to unbalance of said bridge network for effecting rebalancing adjustment of said second core, and compensating means for varying the relation between the extents of corresponding movements of said cores comprising variable resistances in adjacent arms of said bridge network, means for effecting adjustments of said resistances in unison, and fixed capacitances respectively in shunt to said resistances jointly therewith determining the magnitude of the compensation.

6. A measuring system comprising a bridge network having an inductance coil in each of four arms thereof, a core movable with respect to one pair of said coils to unbalance said bridge in response to changes in magnitude of a condition, a second core movable with respect to another pair of said coils, means responsive to unbalance of said bridge network for effecting rebalancing adjustment of said second core, and compensating means for varying the relation between the extents of corresponding movements of said cores comprising variable resistances in each of two adjacent arms of said bridge network, condensers respectively in shunt to the resistances and a plurality of means each responsive to disturbing changes of another condition and effective in unison to adjust a pair of aforesaid resistances disposed in said adjacent arms.

7. A measuring system comprising a balanceable network including inductance coils having cores movable respectively to unbalance said network in response to change from previous magnitude of a condition and to restore balance thereof at existing magnitude of the condition, and compensating means for varying the relation between the extents of aforesaid movements of said cores comprising variable resistances included in different branches of said network, means for effecting adjustment of said resistances in unison, and fixed reactances respectively in shunt to said resistances therewith jointly to determine the magnitude of the compensation.

8. A measuring system comprising a balanceable network including inductance coils having cores movable respectively to unbalance said network in response to change from previous magnitude of a condition and to restore balance thereof at existing magnitude of the condition, and compensating means for varying the relation between the extents of aforesaid movements of said cores comprising impedance groups each comprising a series of variable resistances and a fixed reactance in shunt to the series, and a plurality of means each responsive to disturbing changes of another condition and effective simultaneously in unison to adjust corresponding resistances of said groups.

9. A measuring system comprising a bridge network having an inductance coil in each of four arms thereof, a core movable with respect to one pair of said coils to unbalance said bridge in response to changes in magnitude of a condition, a second core movable with respect to another pair of said coils, means responsive to unbalance of said bridge network for effecting rebalancing adjustment of said second core, and compensating means for varying the relation between the extents of corresponding movements of said cores comprising variable resistances in adjacent arms of said bridge network, means for effecting adjustments of said resistances in unison and fixed reactances respectively in shunt to said resistances therewith jointly to determine the magnitude of the compensation.

JOSEPH RAZEK.